May 22, 1956 J. L. POTTER 2,747,159
ELECTROMAGNETIC APPARATUS
Filed Oct. 7, 1952 3 Sheets-Sheet 1
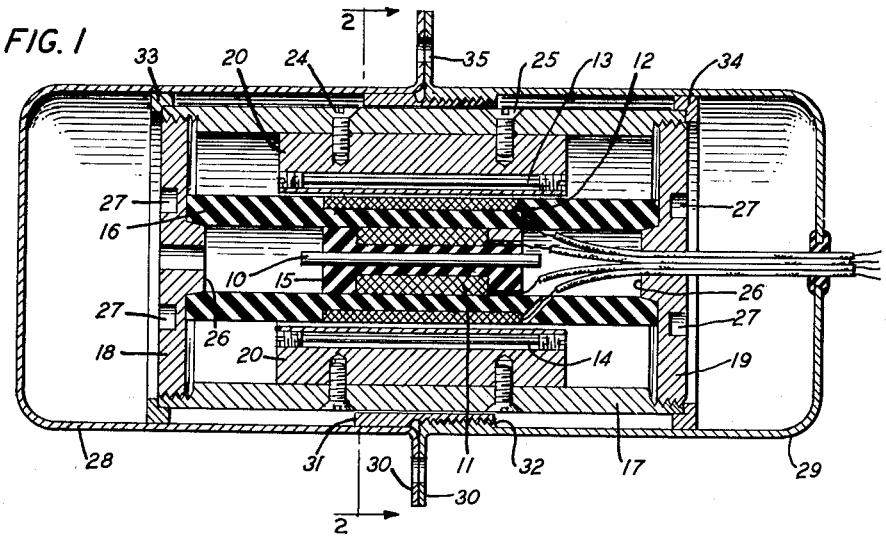
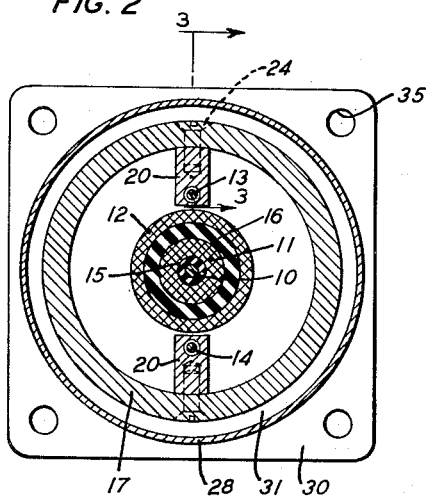
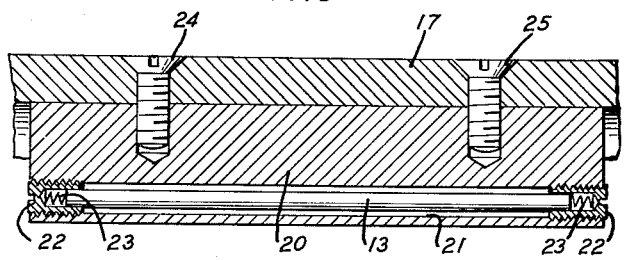
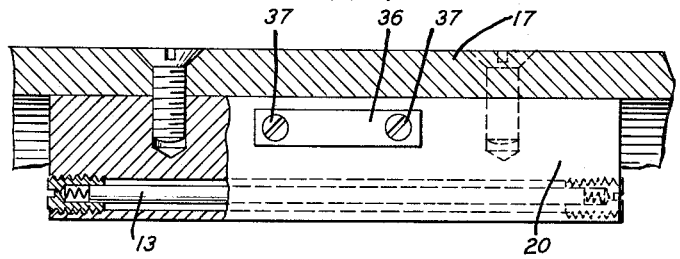
INVENTOR
J. L. POTTER
BY
G. F. Heuerman
ATTORNEY

INVENTOR
J. L. POTTER
BY
ATTORNEY

May 22, 1956  J. L. POTTER  2,747,159
ELECTROMAGNETIC APPARATUS
Filed Oct. 7, 1952  3 Sheets-Sheet 3

FIG. 6

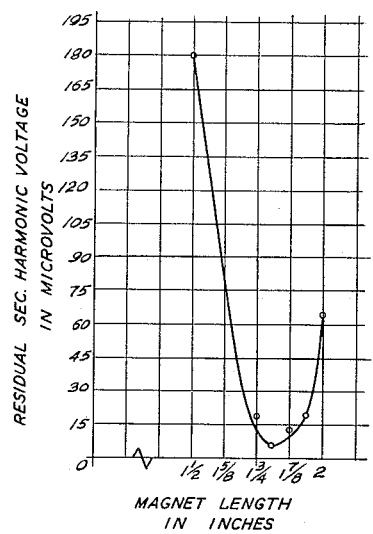

RESIDUAL SECOND HARMONIC OUTPUT FROM 2000 C.P.S. FILTER VS. MAGNET LENGTH

MAGNET LENGTH IN INCHES

FIG. 7

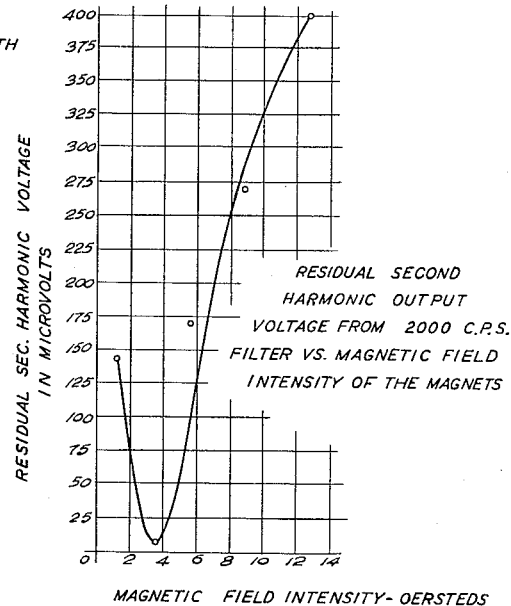

RESIDUAL SECOND HARMONIC OUTPUT VOLTAGE FROM 2000 C.P.S. FILTER VS. MAGNETIC FIELD INTENSITY OF THE MAGNETS

MAGNETIC FIELD INTENSITY - OERSTEDS

FIG. 8

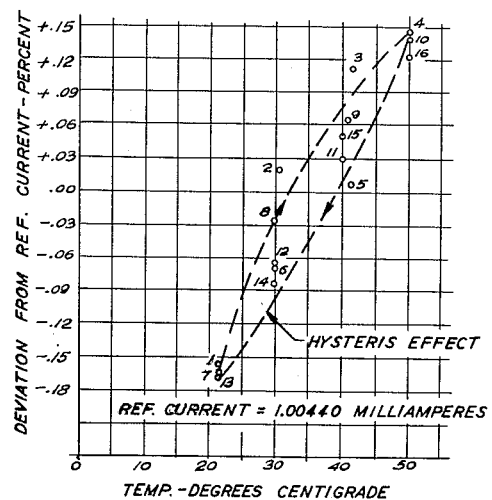

PERCENT CURRENT DEV. VS. TEMP. (COPPER CAVITY WITH PERMALLOY SHIELD)

REF. CURRENT = 1.00440 MILLIAMPERES

TEMP. - DEGREES CENTIGRADE

FIG. 9

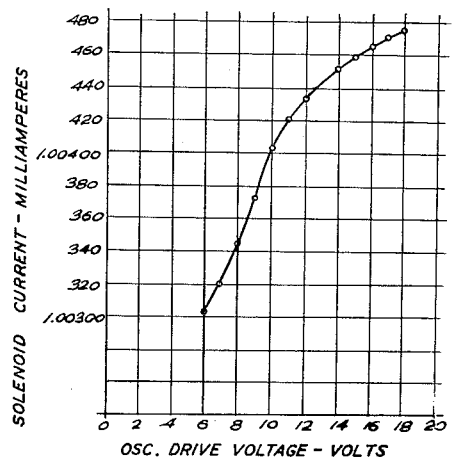

EFFECT OF OSC. DRIVE VOLTAGE ON SOLENOID CURRENT

OSC. DRIVE VOLTAGE - VOLTS

INVENTOR
J. L. POTTER
BY
G. J. Heuerman
ATTORNEY

United States Patent Office 2,747,159
Patented May 22, 1956

2,747,159

ELECTROMAGNETIC APPARATUS

James L. Potter, Highland Park, N. J., assignor to Bell Telephone Laboratories, Incorporated, New York, N. Y., a corporation of New York Application October 7, 1952, Serial No. 313,515

16 Claims. (Cl. 323—92)

This invention relates to electromagnetic apparatus and particularly to such apparatus for producing a substantially constant reference source of current or voltage.

The type of electromagnetic apparatus to which the invention relates is a magnetic modulator, also known as a magnettor. In a simple form of magnettor there is provided a single winding which may be wound about a cylindrical core of magnetic material for example. When there is supplied to the winding a pure sinusoidal current of a frequency $f$ and of an amplitude sufficient to bring the flux in the core into the saturated region above the knee of its characteristic magnetization curve during a portion of each half cycle, the voltage across the winding will be found to contain as components the fundamental frequency $f$ and odd harmonics thereof. If, in addition to the alternating current supplied to the winding, a direct current of relatively small amplitude is also supplied to the winding, the second and higher even harmonic components of the fundamental frequency will appear in the voltage across the winding. A phase shift of 180 degrees of the second harmonic output voltage will result from a reversal of the direction of the direct current supplied to the winding or from reversal of the direction of the direct component of the flux in the core.

For a certain direction of the direct current in the winding of the magnettor, there may be set up by means of a permanent magnet a field for opposing the field due to the direct current in the winding at the core of the magnettor. When the field due to the direct current is less than that of the permanent magnet, the second harmonic component of one phase will decrease as the direct current is increased over a certain range in accordance with a substantially linear relationship. When the field due to the direct current in the winding is larger than the field due to the permanent magnet, the second harmonic component of opposite phase will increase as the direct current is increased over a certain range in accordance with a substantially linear relationship. However, difficulty has been experienced heretofore in reducing the amplitude of the second harmonic to zero or to a very low value near zero for a certain amplitude of direct current supplied to the winding of the magnettor, as is desirable in an arrangement for obtaining a substantially constant reference current or voltage. In such an arrangement there is supplied to the winding of the magnettor a reference direct current the amplitude of which is controlled by the second harmonic component generated by the magnettor. A second harmonic of a certain phase produced due to an increase of reference current from a predetermined normal value causes a reduction of the reference current and a second harmonic of opposite phase produced due to a decrease of the reference current from the normal value causes an increase of the reference current, thereby reducing changes of the reference current. To maintain the reference current constant with a high degree of accuracy it is desirable to reduce to zero or a very low amplitude, the second harmonic generated in the magnettor when the reference current has a desired amplitude, thus permitting very small changes of reference current to be detected and utilized to return the reference current to its correct amplitude.

Based upon tests which have been made, it is believed that the difficulty in reducing the second harmonic component generated in the magnettor to zero or a very low amplitude may be caused by the fact that the field set up to oppose the field due to a certain direct current supplied to the magnettor winding did not reduce to zero the field at all parts of the core throughout its length. It is further believed that due to such an unsymmetrical field at the magnettor core a second harmonic voltage is generated in one portion of the magnettor winding while another portion of the winding, being an inductive load for the first portion, causes a 90-degree shift in phase of the second harmonic voltage. Therefore, such residual second harmonic components are in quadrature with respect to the second harmonic components produced when the field set up by the direct current supplied to the magnettor has a substantially larger or smaller magnitude than the field produced by the permanent magnet.

An object of the invention is to provide a compact and portable magnettor of rugged construction.

A further object is to provide in a magnettor a reference field for substantially completely neutralizing the field due to a predetermined direct current supplied to a winding of the magnettor at all portions of the magnettor core.

The generation of the residual second harmonic components is reduced to a minimum value near zero by providing a novel magnettor structure herein shown and described for the purpose of illustration. The magnettor comprises a core of magnetic material having a rectilinear axis and two solenoid windings coaxial with respect to the core and symmetrically arranged with respect thereto, the inner winding being the alternating-current winding and the outer winding being the direct-current winding. Permanent magnets are provided for setting up a field for opposing the field due to current in the direct-current winding. The magnets are of such length and strength and are so positioned with respect to the direct-current magnettor winding and the core that the resultant direct component of the field is reduced to a very low value or substantially zero at all parts of the core throughout its length. The magnets are arranged symmetrically with respect to the core axis and are spaced therefrom by a distance greater than the spacing of the direct-current winding from the core axis. The magnets are each somewhat longer than the axial length of the direct-current winding. The core, the windings and the magnets are supported securely by a cylindrical enclosure which may be made of a magnetic material so as to shield the windings, the core and the permanent magnets. Preferably, however, the supporting cavity is made of a non-magnetic material such as copper and the supporting cavity is in turn supported within a second enclosure of magnetic material such as Permalloy. Each magnet is secured between helical springs to allow for expansion and contraction of the magnet without material change of pressure at the ends of the magnet to avoid magnetostrictive effects.

The invention will be further described with reference to the accompanying drawing in which:

Fig. 1 is a view partly in section of a magnettor constructed in accordance with the invention.

Fig. 2 is a view taken along the line 2—2 of Fig. 1.

Fig. 3 is an enlarged detail view of a portion of the magnettor taken along the line 3—3 of Fig. 2.

Fig. 4 is an enlarged detail view partly in section of a modification of the magnettor shown in Fig. 1.

Figs. 6 to 9 are curves to which reference will be made in explaining the invention.

Figure 5:
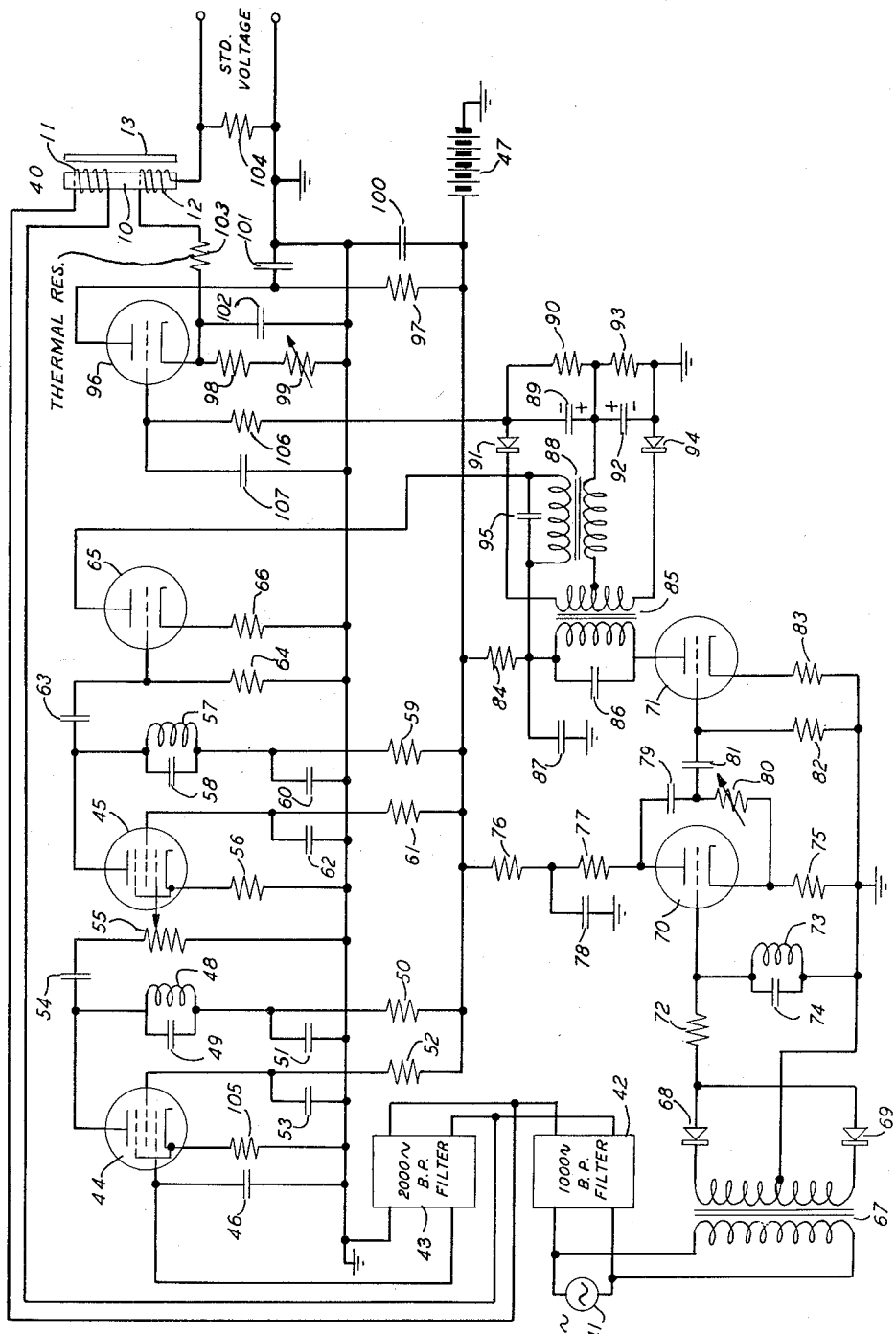
Fig. 5 is a diagrammatic view of a circuit employing a magnettor constructed in accordance with the present invention to provide a standard reference current or voltage.

Referring now to the drawing, there is provided a magnettor comprising a core 10 of magnetic material, such as a nickel-iron alloy known as Permalloy, an alternating-current winding 11 and a direct-current winding 12, each positioned coaxially and symmetrically with respect to the core, and permanent magnets 13 and 14 positioned symmetrically with respect to the core axis and each having a longitudinal axis parallel to the core axis. Preferably the relative positions and dimensions of the parts are substantially as shown in the drawing, the distance between the poles of each magnet being about 1⅞ inches and the length of the winding 12 being about 1½ inches. The magnets may be of a steel alloy known as vicalloy, for example.

There are provided a spool 15 of insulating material having a recessed portion on which the alternating-current winding 11 is wound and a second spool 16 of insulating material having a recessed portion on which the direct-current winding 12 is wound. The core 10 fits securely in the bore of the inner spool 15 and the spool 15 fits securely in the bore of the outer spool 16. There is provided a supporting cylindrical enclosure 17 having end plates 18 and 19, a peripheral portion of each of which is threaded to engage an internally threaded portion of the cylinder 17. There is provided for supporting each magnet, a magnet support 20 of non-magnetic material having a bore 21 therein in which the magnet is held in position by means of a recessed screw 22 and a helical spring 23 at each end of the bore 21. The springs 23 are provided to permit expansion and contraction of the magnet due to temperature changes without changing the pressure on the magnet in the direction of its longitudinal axis. Each magnet holder is secured along the inner surface of the cylinder 17 by means of screws 24 and 25. Each of the end plates 18 and 19 has a projecting portion 26 which fits securely in the bore of the outer spool 16. When the end plates 18 and 19 are screwed into position with the aid of a wrench engaging the recessed portions 27, the windings, the core and the permanent magnets are held firmly in position with respect to each other and with respect to the supporting cylinder 17. The cylinder 17 is positioned centrally within a cylindrical shield of magnetic material such as Permalloy to shield the magnettor from extraneous magnetic fields, such as the earth's field. The shield is made up of two portions 28 and 29 each having a flange 30. A projecting ring 31 secured to the shield portion 28 is provided for preventing lateral movement of the cylinder 17 within the shield. The ring 31 has a threaded portion for engaging a threaded ring 32 secured to the shield portion 29 so that the portions 28 and 29 may be secured to each other and the two flange portions 30 brought into engagement to close the shield. The ring 33 secured to shield portion 28 and the ring 34 secured to shield portion 29 are provided to prevent longitudinal movement of the cavity 17 within the shield. Openings are provided in the end plate 19 and in the shield portion 29 to permit leads from the windings 11 and 12 to be brought through the cavity and the shield, openings being provided for this purpose in the spools 15 and 16. The holes 35 are provided in the shield portions 28 and 29 to permit the two portions of the shield to be additionally secured to each other and to a support, if desired.

In some cases it may be preferable to construct the cylindrical support 17 and the end plates 18 and 19 of a magnetic material such as Permalloy. It may then be found that the magnetic shield 28, 29 is not required and may be dispensed with. In that case a strip 36 of a metallic alloy such as iron and nickel may be secured by means of screws 37 to the magnetic holder 20 for a magnet 13, as shown in Fig. 4. The metallic strip 36 is in a shunt path for the magnetic field set up by the permanent magnet 13 and is provided to compensate for changes of strength of the magnet 13 with temperature changes.

A circuit arrangement in which a magnettor constructed in accordance with the invention may be used for setting up a substantially constant reference current or voltage is shown in Fig. 5. In this figure, the magnettor 40 is shown diagrammatically and comprises a core 10, an alternating current winding 11, a direct-current winding 12 and a permanent magnet 13. There is provided an oscillator 41 for generating an alternating current having a fundamental frequency of 1000 cycles per second, for example. Current of this fundamental frequency is selected by means of a band pass filter 42 and the filter output current of this fundamental frequency is supplied to the alternating-current winding 11 of the magnettor 40.

The amplitude of this alternating current is sufficiently large to saturate the core 10 during a portion of each half cycle of the alternating current, that is to bring the flux in the core into a region above the knee of its characteristic magnetization curve. Direct current is supplied to the direct-current winding 12 of the magnettor, as will later be described, and the field set up due to the direct current in winding 12 is opposed by a field set up by permanent magnet 13. Assuming for the present that one of these opposing fields is larger than the other so that there is a resultant unidirectional component of flux in the core 10, there will be generated across the winding 11 a component voltage which is the second harmonic of the fundamental frequency, the amplitude of the second harmonic component varying with the amplitude of the direct current in winding 13.

The second harmonic frequency component is selected by a band pass filter 43 and is impressed upon the input of a tuned amplifier comprising space current devices 44 and 45. One of the output terminals of filter 43 is connected to ground and the other output terminal is connected to the control electrode of tube 44, the cathode of tube 44 being connected through a resistor 105 to ground and the control electrode being connected through a capacitor 46 to ground. Space current is supplied to tube 44 from a suitable direct-current source such as a battery 47 having its negative terminal grounded. The anode of tube 44 is connected through a path comprising an inductance element 48 and a condenser 49, in parallel, which is resonant to the 2000 cycle frequency and a resistor 50 in series to the positive terminal of battery 47, a common terminal of inductance element 48, condenser 49 and resistor 50 being connected through a condenser 51 to ground. The screen-grid of tube 44 is connected through a resistor 52 to the positive battery terminal and through a condenser 53 to ground. The anode of tube 44 is connected through a condenser 54 and a potentiometer 55 in series to ground, the variable tap of potentiometer 55 being connected to the control grid of tube 45 and the cathode of tube 45 being connected through a resistor 56 to ground. The anode of tube 45 is connected to the positive terminal of battery 47 through an anti-resonant path comprising an inductance 57 and a condenser 58 and in series therewith a resistor 59, the common terminal of elements 57, 58 and 59 being connected through a condenser 60 to ground. The anti-resonant path 57, 58, is like the anti-resonant path 48, 49. The screen-grid of tube 45 is connected through a resistor 61 to the positive battery terminal and it is connected through a condenser 62 to ground. The anode of tube 45 is connected through a condenser 63 and resistor 64 in series to ground, the common terminal of condenser 63 and resistor 64 being connected to the control grid of a detector space current device 65. The cathode of tube 65 is connected through a resistor 66 to ground.

There is provided a frequency doubler circuit comprising a full wave rectifier and space current devices 70 and 71. The rectifier comprises a transformer 67 and rectifying elements 68 and 69. The primary of transformer 67 is connected to the oscillator 41. A resistor 72 and an anti-resonant path comprising an inductance 73 and a condenser 74 are connected in series across the output of full wave rectifier 68, 69. The voltage across the output of the rectifier 68, 69 is a unidirectional pulsating voltage having pulses recurring at the rate of 2000 pulses per second and the anti-resonant path 73, 74 is tuned to a frequency of 2000 cycles per second. The voltage across this tuned circuit is impressed upon the control grid-cathode circuit of tube 70 through a cathode resistor 75 connecting the cathode of tube 70 to ground, the negative output terminal of rectifier 68, 69 also being grounded. Space current is supplied from battery 47 to tube 70 through resistors 76 and 77 going to the anode of tube 70 and through resistor 75 connected from the cathode to ground. A condenser 78 is connected in a path from a common terminal of resistors 76 and 77 to ground. A path connecting the anode and cathode of tube 70 comprises in series a condenser 79 and a variable resistor 80 and a path connecting the common terminal of condenser 79 and resistor 80 to ground comprises in series a condenser 81 and a resistor 82. The alternating voltage across resistor 82 is impressed between the control grid of tube 71 and ground, the cathode of tube 71 being connected to ground through a resistor 83. Space current is supplied to tube 71 through a circuit from battery 47 through a resistor 84 and the primary winding of a transformer 85 to the anode and from the cathode of the tube through resistor 83 to ground. A condenser 86 is connected across the primary transformer winding to form a tuned circuit resonant to the 2000-cycle frequency. A condenser 87 is provided in a path connecting a common terminal of resistor 84 and the tuned circuit comprising condenser 86 and the transformer primary to ground.

There is thus induced across the secondary winding of transformer 85 a voltage having a frequency of 2000 cycles per second. Space current is supplied to tube 65 from battery 47 through resistor 84 and the primary winding of a transformer 88 to the anode of tube 65 and from its cathode through resistor 66 to ground. There is provided a circuit which may be traced from a midterminal of the secondary winding of transformer 85 through the secondary winding of transformer 88, through a path comprising a condenser 89 and a resistor 90 in parallel, and through a rectifying element 91 to the upper terminal of the secondary winding of transformer 85, as shown in the drawing. A similar circuit is provided which may be traced from the center tap of the secondary winding of transformer 85 through the secondary winding of transformer 88, through a path comprising a condenser 92 and a resistor 93 in parallel, and through rectifying element 94 to the lower terminal of the secondary winding of transformer 85, the common terminal of resistor 93, condenser 92 and rectifying element 94 being connected to ground. A condenser 95 is provided across the primary winding of transformer 88 to form a circuit tuned to a frequency of 2000 cycles per second.

There will thus be induced in the secondary winding of transformer 88 a voltage having a frequency of 2000 cycles per second, that is, a voltage having the same frequency as the frequency of the voltage across the secondary winding of transformer 85. The phase of the voltage across the secondary winding of transformer 88 will depend upon the direction of any unidirectional flux which may be present in the core 10 of the magnettor 40. A unidirectional flux in core 10 due to an increase of current in winding 12 will cause the production across the secondary winding of transformer 88 a voltage which is in phase with the voltage across the upper half of the secondary winding of transformer 85 in the circuit comprising rectifier 91 and condenser 89 and which is out of phase with the voltage across the lower half of the secondary winding of transformer 85 in the circuit comprising rectifier 94 and condenser 92. A unidirectional flux in core 10 due to a decrease of current in winding 12 will have an opposite effect, that is, there will be set up across the secondary winding of transformer 88 a voltage which is in phase with the voltage across the lower half of the secondary winding of transformer 85 in the circuit comprising rectifier 94 and condenser 92 and which is out of phase with the voltage across the upper half of the secondary winding of transformer 85 in the circuit comprising rectifier 91 and condenser 89. The voltage across a half portion of the secondary winding of transformer 85 is under all conditions larger than the voltage across the secondary winding of transformer 88. Therefore, an increase of current in winding 12 above a predetermined amplitude will result in charging condenser 89 through rectifier 91 to a larger voltage than the voltage to which condenser 92 becomes charged through the rectifier 94, the charge on condenser 89 increasing and the charge on condenser 92 decreasing as the current through winding 12 is progressively increased. A decrease of current in winding 12 below the predetermined amplitude will result in charging condenser 92 through rectifier 94 to a larger voltage than the voltage to which condenser 89 is charged through rectifier 91, the charge on condenser 92 increasing, and the charge on condenser 89 decreasing as the current through winding 12 is progressively decreased. The polarities of the voltages to which condensers 89 and 92 respectively are charged are opposed with respect to each other as shown in the drawing. The potential of the common terminal of condenser 89 and rectifier element 91 is negative with respect to ground when the charge on condenser 89 is larger than the charge on condenser 92 and the potential of said common terminal is positive with respect to ground when the charge on condenser 92 is larger than the charge on condenser 89. When the direct-current flux in core 10 is substantially zero, and, as a result, the voltage across the secondary winding of transformer 88 is also substantially zero, since substantially no second harmonic component is generated in the magnettor winding 11, the charges on condensers 89 and 92 will be substantially equal and the common terminal of rectifier 91 and condenser 89 will be substantially at ground potential. The resistors 90 and 93 are provided so that condensers 89 and 92 may discharge when the charging voltages for the respective condensers are reduced.

There is provided a space current device 96 to which space current is supplied through a circuit which may be traced from battery 47 through a resistor 97 to the anode of the tube and from its cathode through a fixed resistor 98 and a variable resistor 99 in series to ground. Condensers 100 and 101 in series are connected across resistor 97, the common terminal of these condensers being connected to ground. A condenser 102 is connected across resistors 98 and 99 in series. The voltage across the cathode resistors 98 and 99 is impressed upon a circuit comprising in series a resistor 103, the magnettor winding 12 and the resistance 104. The resistor 103 is a temperature compensating resistor and is provided to prevent changes of current in the circuit in response to temperature changes and the resistance 104 is a constant resistance having a negligibly small temperature coefficient of resistance. The control electrode of tube 96 is connected through a resistor 106 to the common terminal of condenser 89 and rectifier 91 and through condenser 107 to ground.

When the control grid of tube 96 is substantially at ground potential, the resistance of variable resistor 99 may be varied to adjust the voltage across resistors 98 and 99 to a desired value so that a predetermined standard reference current flows through winding 12 and resistor 104. The voltage across resistor 104 is then a predetermined standard reference voltage. For this value of current flowing through winding 12, the field due to current in winding 12 is substantially annulled by the opposing field due to the permanent magnet at all parts of the core 10 so that the amplitude of the second harmonic voltage generated across the magnettor of winding 11 is zero or a very small amplitude near zero. The alternating voltage appearing across resistor 64 in the control electrode-cathode circuit of tube 65 and, therefore, the voltage induced in the secondary winding of transformer 88 are also substantially zero and the vector sum of the voltages across condensers 89 and 92 is substantially zero. Thus the control electrode of tube 96 is substantially at ground potential. Assuming that the current through winding 12 and resistor 104 increases slightly, a second harmonic voltage of a certain phase will be generated in magnettor winding 11 and there will appear across secondary winding of transformer 88 a second harmonic voltage of such phase that the charge on condenser 89 will increase and that the charge on condenser 92 will decrease. The control grid of tube 96 will therefore become negative with respect to ground to reduce the current in winding 12 and resistor 104. The initially assumed rise of current through winding 12 and resistor 104 and, therefore, the assumed rise of voltage across resistor 104, is thus minimized or substantially prevented. Similarly, if the current through winding 12 and resistor 104 decreases slightly, the phase of the voltage generated across magnettor winding 11 is reversed and the phase of the voltage induced in secondary winding of transformer 88 is reversed, each with respect to the phase in the case where the current through winding 12 increases. Therefore, the voltage to which condenser 92 is charged increases, while the voltage across condenser 89 decreases. The potential of the control grid of tube 96 is thus made positive with respect to ground to cause an increase of current through magnettor winding 12 and resistor 104. The assumed decrease of current through winding 12 and resistor 104 and the resulting decrease of voltage across resistor 104 are thus minimized or substantially prevented.

Figs. 6 to 9 inclusive are curves based on experimental data obtained with a magnettor of the type shown in Fig. 1. Fig. 6 shows the relationship between the length of each permanent magnet between its poles and the residual second harmonic voltage, that is, the minimum second harmonic voltage which can be obtained from the output of the filter 43 by adjusting the direct current in magnettor winding 12. The curve indicates the importance of using a magnet of certain length for a magnettor of a certain design. In the magnettor tested, designed as shown in Fig. 1, the optimum magnet length was found to be 1 13/16 inches, the axial length of the solenoid winding 12 being 1½ inches.

The curve of Fig. 7 is based on the results of tests to determine the effect of varying the intensity of magnetization of the permanent magnets upon the second harmonic residual voltage. The current in winding 12 required to reduce the second harmonic voltage to a minimum was used as a measure of the intensity of magnetization. The curve shows that the residual second harmonic voltage is a function of the intensity of magnetization. This is believed to be due to a shifting of the poles of the magnet, thereby changing the effective magnet length, as the intensity of magnetization is increased and is probably caused by internal saturation.

In Fig. 8 is shown a plot of percent change in current through magnettor winding 12 with respect to temperature. The points in the diagram are numbered in the order in which the readings were taken over a period of about two weeks. As shown by the diagram, the current remained within ±0.18 percent when the temperature was varied over a range from about twenty degrees centigrade to fifty degrees centigrade.

The curve of Fig. 9 shows the effect of changing the drive voltage from oscillator 41 and filter 42 supplied to the magnettor winding 11 upon the current in winding 12. Also present in this curve are some circuit effects since the oscillator 41 also supplies current to the balanced phase detector. The effect of the drive voltage, however, is small under normal operation of the magnettor standard compared to other factors present.

After the initial temperature cycle, as shown in Fig. 8, it was found that the current in the solenoid winding 12 stayed within a range of less than 0.1 percent for a temperature change from twenty degrees centigrade to fifty degrees centigrade. At a constant temperature the accuracy was better than 0.01 percent.

What is claimed is:

1. Electromagnetic apparatus comprising winding means having an axis extending between the end portions thereof and spaced from said axis by a maximum distance less than the length of said axis, a core coaxial with said winding means, means for supplying to said winding means alternating current from an alternating-current supply source and direct current from a direct-current supply source to cause to be set up a magnetic field having an alternating and a direct component, a permanent magnet fixedly spaced with respect to said axis by a distance longer than said maximum spacing of said winding means from said axis and having a rectilinear dimension extending between its opposite poles substantially parallel to said axis to set up at substantially all portions of said core a magnetic field substantially equal to and opposing the direct component of the magnetic field set up due to direct current supplied to said winding means, thereby reducing to a minimum value the resultant of said direct component magnetic field and the magnetic field due to said permanent magnet, and means for shielding said winding means and said permanent magnet from an extraneous magnetic field.

2. Electromagnetic apparatus comprising winding means having an axis extending between the end portion thereof and having a maximum spacing from said axis less than the length of said axis, a core coaxial with said winding means, means for supplying to said winding means alternating current from an alternating-current supply source having a predetermined fundamental frequency and direct current from a direct-current supply source to cause to be set up a magnetic field having an alternating and a direct component, thereby causing to be set up in said winding means a current component the frequency of which is an even harmonic of said fundamental frequency and the amplitude of which is a function of the intensity of the direct component of said magnetic field along said axis, means for controlling the current supplied to said winding means in response to amplitude changes of said even harmonic current component, a permanent magnet fixedly spaced from said axis by a distance longer than said maximum spacing of said winding means from said axis and having a rectilinear dimension extending between its opposite poles substantially parallel to said axis to set up at substantially all portions of said core a magnetic field substantially equal to and opposing the direct component of the magnetic field set up due to the direct current supplied to said winding means, thereby reducing said even harmonic current component to a minimum, and means for shielding said winding means and said permanent magnet from an extraneous magnetic field.

3. An electromagnetic device comprising a core of magnetic material having a longitudinal axis extending between the ends thereof, winding means in fixed position with respect to said core having an axis extending between its end portions lying on the core axis and said winding means being spaced from its axis by a maximum distance less than the length of its axis, permanent magnets symmetrically arranged with respect to said core axis and fixedly spaced from said core axis by a distance longer than said maximum spacing of said winding means from said core axis and each having a rectilinear dimension extending between its opposite poles substantially parallel to said core axis and longer than said axis of said winding means, and a shield of magnetic material in fixed position with respect to said core axis substantially completely enclosing said core, said winding means and said permanent magnets.

4. An electromagnetic device comprising a core of magnetic material having a longitudinal axis extending between the ends thereof, a solenoid winding having an axis lying on the core axis and having a length greater than its diameter, permanent magnets symmetrically arranged with respect to said core axis and spaced from said core axis by a distance longer than the radius of said solenoid and each having a length extending between its opposite poles substantially parallel to said core axis and larger than the length of said solenoid, the centers of said magnets and the center of said solenoid lying in a plane perpendicular to said core axis, and a magnetic shield substantially completely enclosing said core, said solenoid and said permanent magnet.

5. An electromagnetic device comprising a core of magnetic material having a longitudinal axis extending between the ends thereof, a solenoid winding having an axis lying on the core axis and having a length longer than its diameter, permanent magnets symmetrically arranged with respect to said core axis and spaced from said core axis by a distance longer than the outer radius of said solenoid and each having its length extending between opposite poles thereof substantially parallel to said core axis and larger than said axis of said solenoid winding, the centers of said core, said solenoid and said magnets lying in a plane perpendicular to said core axis, and a shield of magnetic material substantially completely enclosing and spaced from said core, said solenoid and said permanent magnets.

6. An electromagnetic device in accordance with claim 5 in which said shield has its end portions substantially parallel to the end portions of said solenoid winding respectively, and in which each end portion of the shield is spaced from the nearer end portion of said solenoid by a distance longer than the spacing of said permanent magnet from said core axis.

7. An electromagnetic device comprising a core of magnetic material having a longitudinal axis extending between the ends thereof, a solenoid winding having an axis lying on the core axis and having a length longer than its diameter, permanent magnets symmetrically arranged with respect to said core axis and spaced from said core axis by a distance longer than the outer radius of said solenoid and each having its length extending between opposite poles thereof substantially parallel to said core axis, the length of each said permanent magnet being longer than the length of said solenoid, the centers of said core, said solenoid and said magnets lying in a plane perpendicular to said core axis, and a shield of magnetic material substantially completely enclosing and spaced from said core, said solenoid and said permanent magnet.

8. Electromagnetic apparatus comprising a cylindrical core of magnetic material, a solenoid winding coaxial with said core having a length longer than its diameter and positioned symmetrically with respect to said core, a plurality of similar elongated permanent magnets positioned symmetrically with respect to said core and said solenoid at a longer distance from said core axis than said solenoid and each magnet having its length extending between opposite poles thereof substantially parallel to said core axis, each magnet being longer than said solenoid, and a cylindrical metallic enclosure positioned symmetrically with respect to said core and said solenoid having a diameter of the order of twice the diameter of said solenoid and a length of the order of twice the length of said permanent magnets.

9. Electromagnetic apparatus having a core of magnetic material, a first winding coaxial with said core and having an axial length longer than its diameter, a second winding coaxial with said core having an axial length and diameter longer than the axial length and diameter respectively of said first winding, a cylindrical metallic enclosure coaxial with said core having an axial length and diameter substantially longer than the axial length and diameter respectively of said second winding, a plurality of permanent magnets each positioned between said cylindrical enclosure and said second winding and each having a length extending between opposite poles thereof substantially parallel to said core axis and longer than the axial length of said second winding, said core, said windings and said cylindrical enclosure having a common center, said magnets being positioned symmetrically about said axis and each having a center lying on a line perpendicular to said core axis and passing through said common center.

10. In combination, a first spool of insulating material, a first solenoid winding on said first spool, a second spool of insulating material fitting securely within the bore of said first spool and positioned centrally with respect to said first spool, a second solenoid winding on said second spool, a core of magnetic material fitting securely within the bore of said second spool and having its center at the center of said second spool, a metallic cylinder of larger diameter than said first spool, metallic end plates for said cylinder each having a threaded portion fitting into a threaded portion of said cylinder, each end plate having a projection fitting securely into the bore of said first spool, the length of said first spool being at least twice the length of said first solenoid winding, said cylinder having an internal diameter of the order of twice the maximum external diameter of said first spool, a plurality of elongated magnets each having a length extending between opposite poles thereof longer than the length of said first solenoid winding, a magnet holder of non-magnetic material for each magnet having a bore therein for holding the magnet, spring means for mounting each magnet in the bore of a magnet holder to permit expansion and contraction of the magnet without change of pressure upon the ends of the magnet, means for securing said magnet holders to the inner surface of said cylinder so that the magnets are positioned symmetrically about said core axis with the length of each magnet parallel to said core axis and so that the center of each magnet lies on a line passing through the center of said core and perpendicular to said core axis.

11. A combination in accordance with claim 10 in which said cylinder is of a non-magnetic material and in which there is provided a shield of magnetic material into which said cylinder fits securely.

12. A combination in accordance with claim 10 in which said cylinder is of a magnetic material and in which there is provided a strip of temperature compensating alloy mounted on each magnet holder.

13. In combination, a cylindrical support, two similar permanent magnets each having a longitudinal axis extending between opposite poles thereof, means secured to said support for mounting said magnets within said cylindrical support in fixed spaced relationship with respect to the inner surface thereof, the longitudinal axes of said magnets being parallel to the axis of said cylindrical support and symmetrical with respect thereto, end plates for said cylindrical support each having an inner projection and each having a threaded portion for engaging a threaded portion at each end of the cylindrical support, a first spool having an axial bore for engaging the inner projections of said end plates to thereby mount said first spool coaxially with said cylindrical support, a second spool having a central portion of smaller diameter than the diameter of the bore of said first spool and having end portions of substantially the same diameter as the bore of said first spool, said second spool being mounted centrally within the bore of said first spool, said second spool having an axial bore, a core of magnetic material having an external diameter substantially equal to the diameter of the bore of said second spool, said core being supported by the bore of said second spool, and two solenoid windings on said spools, respectively.

14. A combination in accordance with claim 13 in which each permanent magnet is at least as long as the axial length of the solenoid winding on said first spool and in which the axis of each magnet is spaced from the axis of the cylindrical support by a distance which is less than half the axial length of the solenoid winding on said first spool.

15. A combination in accordance with claim 13 in which there is provided a casing of magnetic material for supporting and substantially completely enclosing said cylindrical support and said end plates.

16. In combination, a core of magnetic material having a rectilinear longitudinal axis, a solenoid winding coaxial with said core, means for supplying a direct current to said winding to set up a unidirectional magnetic field, a magnetic shield substantially enclosing said core and said solenoid winding, and means for substantially completely neutralizing the field set up due to the direct current supplied to said winding comprising at least one permanent magnet in fixed spaced relationship with respect to said solenoid winding and having a rectilinear longitudinal axis extending between its opposite poles substantially parallel to the axis of said solenoid winding and said core.

References Cited in the file of this patent

UNITED STATES PATENTS 2,615,155   Ogle _____ Oct. 21, 1952